Aug. 6, 1968  W. J. DIDYCZ  3,395,982
SYNTHETIC PRODUCTION OF AMMONIA
Filed Oct. 14, 1966
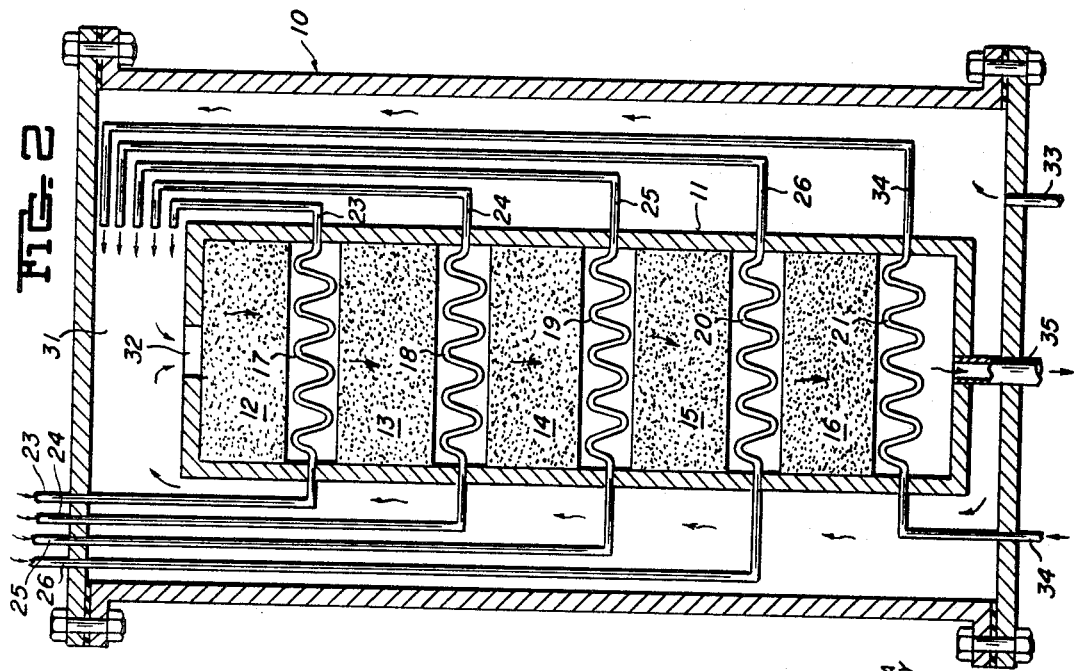
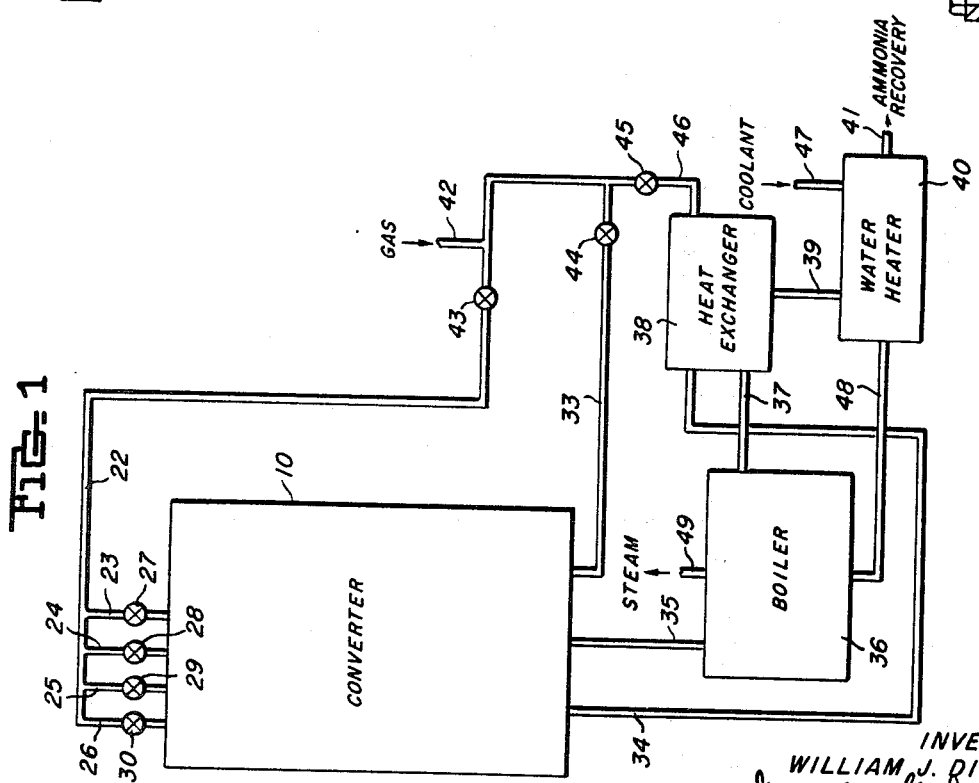
INVENTOR
WILLIAM J. DIDYCZ
By Donald G. Dalton
Attorney 3,395,982
SYNTHETIC PRODUCTION OF AMMONIA
William J. Didycz, Whitehall Borough, Pa., assignor to United States Steel Corporation, a corporation of Delaware
Filed Oct. 14, 1966, Ser. No. 586,738
5 Claims. (Cl. 23—199)

ABSTRACT OF THE DISCLOSURE

In the synthetic production of ammonia in a high-pressure catalytic converter comprising a series of catalyst beds disposed one above the other in a converter shell, the process comprises dividing the gases to be reacted into a plurality of separate streams, passing one of the streams in indirect heat-exchange with the reaction products outflowing from each catalyst bed, passing one of the streams peripherally of the catalyst beds, then combining all of the streams and passing the combined stream serially through the catalyst beds and heat exchangers respectively, thereby effecting reaction of the gases in the beds.

---

This invention relates to a process for performing exothermic reactions under high pressure and at an elevated temperature. More particularly, the invention relates to the synthetic production of ammonia from its constituent gases, nitrogen and hydrogen.

It is known that, in order to realize a high yield from exothermic reactions carried out at high pressures, such as ammonia synthesis, the temperature of the catalyst must be kept within defined limits. Hence, it is necessary to remove carefully the heat evolving from the reaction.

It is also known to control the heat of reaction by preheating the cold gases being supplied to the reaction, various types of heat exchangers have been placed after and within the catalyst mass for serial, cold-gas flow therethrough. With such devices, however, it is difficult to obtain the desired gradient of temperature. Local hot spots and cold spots are found in various parts of the catalyst mass with resultant inefficiency in the synthesis reaction.

Further, it is known that cooling between catalyst beds may be effected by direct mixing of the reacting gas with controlled amounts of cold, fresh feed gas. This practice, however, results in dilution of the ammonia in the converted gases, thereby lowering the yield for a given size converter.

It is also known, for example, according to U.S. Patent No. 2,898,183, to divide the catalyst mass into a number of beds disposed one above the other in a converter shell and to insert indirect heat exchangers in the intermediate spaces. Equalizing the pressure in the cooling-water system with the pressure in the reactor as taught in the above patent would require heat exchangers between the beds, since the cooling water under the disclosed pressure of 500 atmospheres would be at a relatively high temperature. In other words, the temperature difference between the coolant and reacting gases would be relatively small. The maintenance would be expensive for the high pressure-temperature control valves in the cooling system as well as for the cooling-water pumping system and its elaborate means to prevent leakage of water into the stream of gases to be synthesized. Such leakage or leakage from a coil in a heat exchanger would immediately deactivate an adjacent catalyst bed.

It is an object of my invention to overcome the above-described difficulties and to provide a more economical apparatus and process. To this end, and in accordance with several features of my invention I provide a series of catalyst beds with heat exchangers therebetween. The cold, entering gases are divided into a plurality of separate streams. A separate stream is brought into indirect heat exchange with the reaction products outflowing from each catalyst bed. Another stream is passed peripherally of the catalyst beds that is, between the container or support for the catalyst beds and the converter shell. The several streams thus preheated are combined and the resulting combined stream is passed serially through the catalyst beds and heat exchangers respectively thereby effecting the synthesis to ammonia.

It is a further object to control the volume of the separate streams to bring the combined stream as it enters the several catalyst beds, to approximately the same predetermined, optimum temperature.

It is yet another object to provide means for extracting a maximum amount of heat from the combined stream flowing from the converter and to utilize the extracted heat to produce steam and to control the temperature of a further separate stream and thus of the combined stream flowing to the first catalyst bed.

These and other objects and advantages of the present invention will become evident from the following description and drawings.

In the drawings:

FIGURE 1 is a schematic representation of a converter and an external system usable therewith in the present process; and FIGURE 2 is a schematic representation of a converter for ammonia synthesis showing some of the apparatus used in the process of the invention.

Referring to the drawings, a high-pressure converter comprises a chamber defined by a high pressure shell 10 wherein a cylindrical basket or container 11 supports on suitable gratings a series of catalyst beds 12, 13, 14, 15, 16 disposed respectively one above the other and in the respective intermediate spaces a series of gas-to-gas or indirect heat exchangers 17, 18, 19, 20, 21.

A cold mixture of hydrogen and nitrogen under high pressure is supplied from a line 22 and divided into a plurality of separate streams in lines 23, 24, 25, 26, the volume thereof flowing in each line being controlled respectively by valves 27, 28, 29, 30. The separate streams in lines 23, 24, 25, 26 flow through conventional heat exchangers 17, 18, 19, 20 respectively. Then the gases heated to an optimum temperature for catalytic reaction are combined in a vestibule or plenum chamber 31 and flow through an opening 32 in container 11 into catalyst bed 12 for serial flow through the catalyst beds and heat exchangers respectively.

A separate gas stream, similar in composition to that flowing in line 22, is supplied from a line 33 to the annular space between container 11 and shell 10. This stream, flowing upwardly and peripherally of the catalyst beds into the vestibule 31, provides adequate cooling for shell 10.

Another separate gas stream, similar in composition to that flowing in lines 22 and 33 is heated externally of the converter as will be explained. This stream flows in line 34 through heat exchanger 21 and then joins the other streams in chamber 31, the combined stream flowing through opening 32 for synthesis to ammonia in the respective beds.

Referring now to FIGURE 1, the combined stream, now fully reacted, after serial flow through the catalyst beds and heat exchangers, respectively, flows from converter 10 through a line 35 serially through a waste heat boiler 36, a line 37, an indirect heat exchanger 38, a line 39, a water heater 40 and thereafter through a line 41 to conventional means (not shown) for the recovery of its ammonia content. It is evident the heat content of the reacted gases is recovered as much as is possible.

Since ammonia represents only a portion of the reacted gases, the outflowing unreacted hydrogen and nitrogen from the recovery means are recycled to converter 10 after fresh hydrogen and nitrogen are added thereto in the proper proportions (not shown). This gas flowing in line 42 is divided. A portion flows through a valve 43 into line 22 where it is divided into separate streams and treated as previously described. Another portion flows through a valve 44 into line 33 where it serves, as before stated, to cool the annular space between converter shell 10 and catalyst container 11. The remaining separate stream flows through a valve 45, a line 46 and heat exchanger 38, where it is heated by the gases in line 37 outflowing from boiler 36. The heated gases then flow through line 34 and heat exchanger 21 and then join the other streams in vestibule 31, as previously described. Cooling water or liquid in a line 47 flows through heater 40 where it is heated by the reaction gases flowing thereto from line 39, as previously described. The heated water then flows from heater 40 through line 48 to boiler 36 where it is converted to steam outflowing through line 49.

In the following example, the converter shown in FIGURES 1 and 2 of the drawings was operated at about 260 atmospheres pressure for the production of ammonia using a synthesis gas containing by volume a 1:3 nitrogen-hydrogen mixture comprising fresh gas and recycle gas from a conventional ammonia recovery means. The combined stream of synthesis gas flowing in line 42 had a temperature of about 30° C. and an ammonia content of about 2.0 mole percent. The respective values divided the combined stream into a plurality of separate streams. The percent by volume flowing in lines 22, 33 and 46 was about 60, 5 and 35 percent respectively and in lines 23, 24, 25 and 26 about 24.2, 13.4, 11.2 ad 11.2 percent respectively. After heating the separate streams as described hereinabove, the combined stream flowing to the first catalyst bed 12 had a temperature of about 377° C. As summarized in Table I, controlling the volume of the separate streams made it possible to cool the combined stream flowing to the several catalyst beds 13–16 inclusive to approximately the same predetermined temperature. Flowing from the converter, as described, the combined stream of fully reacted gas in lines 35, 37, 39 and 41 had a temperature of about 384°, 207°, 136° and 60° C. respectively. Accordingly, the separate stream flowing in line 34 to exchanger 21 was heated to about 197° C. and waste heat boiler 36 produced about one pound of 150 p.s.i.g. steam per pound of ammonia product.

TABLE I

| | Inlet To— | | | | | Exit From Bed 16 |
|---|---|---|---|---|---|---|
| | Bed 12 | Bed 13 | Bed 14 | Bed 15 | Bed 16 | |
| Combined Stream Temperature, °C | 377 | 457 | 447 | 437 | 422 | 447 |
| Ammonia Content, Mole percent | 2.0 | 12.8 | 15.8 | 18.7 | 21.0 | 23.0 |

It will be evident from the above description and specific example that by invention differs from the prior art in the combination of gas-to-gas cooling within the heat exchanger after each catalyst bed, the use of the cold feed gas as coolant and reactant in a multiple-catalyst-bed arrangement, and the generation of steam from the heat of reaction remaining in the reaction product upon exit from the converter. Controlling the volume of cold gas to the heat exchangers, in the converter, places the reacting gases in a more favorable equilibrium condition before entry to the next catalyst bed. A further advantage of this arrangement is more efficient cooling with smaller heat exchangers than is possible with the arrangement disclosed in U.S. Patent No. 2,898,183. This is due to the relatively large temperature differences between the reaction and cooling gases flowing in the heat exchangers. Also, there would be relatively less cooling-system maintenance expense. Leakage of gas in a heat exchanger could mean gradual contamination rather than immediate deactivation of an adjacent catalyst bed caused by water leaking into the reaction-gas stream. Additionally, there is efficient heat recovery and steam production from the ammonia-rich gas flowing from the converter as opposed to the waste of this heat in said patent. Further, there is additional flexibility in supplying a combined stream to the first catalyst bed having an optimum temperature. This is made possible by preheating and controlling the volume of the stream flowing to exchanger 21 in line 34, in addition to volume control of the streams flowing to the other exchangers. Additionally, preheating the gas in line 34, results in a hotter gas flow to and increased steam generation in boiler 36.

Although I have disclosed herein the practice of my invention, I intend to cover as well any change or modification therein which may be made without departing from the spirit and scope of the invention.

I claim:

1. In the synthetic production of ammonia in a high-pressure catalytic converter comprising a series of catalyst beds disposed one above the other in a converter shell, the process which comprises dividing the entering gases to be reacted into a plurality of separate streams, passing one of said streams in indirect heat-exchange with the reaction products outflowing from each catalyst bed, passing one of said streams peripherally of said catalyst beds, then combining all said streams and passing the combined stream serially through the catalyst beds and heat exchangers respectively, thereby effecting reaction of the gases in said beds.

2. The process as described in claim 1 characterized by controlling the volume of the separate streams to bring the combined stream as it enters the several catalyst beds to a temperature approximately the same for each.

3. The process as described in claim 1 characterized by heating one of said streams externally of said converter shell and then bringing it into indirect heat exchange with the combined stream after it departs from the last catalyst bed in the series.

4. A process as described in claim 1 characterized by conducting the combined stream flowing from said converter shell serially through a waste-heat boiler and then into indirect heat exchange with one of said streams and thereafter conducting said one of said streams through the last heat exchanger in the series.

5. A process as described in claim 4, characterized by conducting the combined stream flowing from indirect heat exchange with said one stream into indirect heat exchange with cooling liquid and thereafter conducting the liquid through said boiler.

References Cited

UNITED STATES PATENTS 2,898,183   8/1959   Fauser _____ 23—199

OSCAR R. VERTIZ, *Primary Examiner.*

H. S. MILLER, *Assistant Examiner.*